(12) United States Patent
Duboff et al.

(10) Patent No.: US 10,252,739 B2
(45) Date of Patent: Apr. 9, 2019

(54) CHILD STROLLER WITH DIRECTIONAL ROCKER

(71) Applicants: Kori Faith Duboff, Brooklyn, NY (US); Kimberly Mae Alicea, Brooklyn, NY (US)

(72) Inventors: Kori Faith Duboff, Brooklyn, NY (US); Kimberly Mae Alicea, Brooklyn, NY (US)

( * ) Notice: Subject to any disclaimer, the term of this patent is extended or adjusted under 35 U.S.C. 154(b) by 0 days.

(21) Appl. No.: 15/937,543

(22) Filed: Mar. 27, 2018

(65) Prior Publication Data
US 2018/0346010 A1 Dec. 6, 2018

Related U.S. Application Data

(60) Provisional application No. 62/477,273, filed on Mar. 27, 2017.

(51) Int. Cl.
*B62B 9/22* (2006.01)
*B62B 9/10* (2006.01)
*B62B 9/14* (2006.01)
*B62B 9/12* (2006.01)

(52) U.S. Cl.
CPC ............. *B62B 9/22* (2013.01); *B62B 9/102* (2013.01); *B62B 9/12* (2013.01); *B62B 9/142* (2013.01)

(58) Field of Classification Search
CPC .. B62B 9/22; B62B 9/102; B62B 9/12; B62B 9/142; B62B 9/18; B62B 9/185; A47D 13/10; A47D 13/102; A47D 13/105; A47D 9/02; A63G 13/00; A63G 13/06; B60N 2/2848
See application file for complete search history.

(56) References Cited

U.S. PATENT DOCUMENTS

| 3,997,180 | A | * | 12/1976 | Okubo | ............... B62B 7/14 280/31 |
| 4,019,751 | A | * | 4/1977 | Nakao | ............... A47D 1/002 280/31 |
| 4,160,553 | A | * | 7/1979 | Fleischer | ............... A47C 3/025 248/601 |
| 4,294,426 | A | * | 10/1981 | Fleischer | ............... A47C 3/025 248/561 |

(Continued)

FOREIGN PATENT DOCUMENTS

| CA | 2225967 C * | 4/2004 | ............... B62B 9/22 |
| DE | 4429572 A1 * | 3/1995 | ............... A47D 9/00 |

(Continued)

*Primary Examiner* — James A Shrive, II
*Assistant Examiner* — Steve Clemmons
(74) *Attorney, Agent, or Firm* — Neal, Gerber & Eisenberg LLP; James P. Muraff

(57) ABSTRACT

A child stroller includes: a frame; a plurality of wheels; a child-seat assembly configured to rock back-and-forth with respect to the frame; a rocker assembly secured to the child-seat assembly. The rocker assembly includes: (a) a plurality of legs, each leg defining an undersurface, each undersurface being arced; (b) a rocker base, the rocker base comprises an inner surface. The stroller is configured such that when the child-seat assembly rocks back-and-forth with respect to the frame, the legs rock back-and-forth upon the inner surface of the rocker base.

17 Claims, 11 Drawing Sheets

(56) References Cited

U.S. PATENT DOCUMENTS

| | | | | |
|---|---|---|---|---|
| 4,620,334 | A | * | 11/1986 | Robinson .................. A47D 9/02 5/108 |
| 5,588,164 | A | * | 12/1996 | Proulx ................. A47D 13/102 297/260.2 |
| 5,660,430 | A | * | 8/1997 | Clarke ..................... A47D 9/02 297/130 |
| 5,988,670 | A | * | 11/1999 | Song ...................... B62B 7/123 280/47.4 |
| 6,250,654 | B1 | * | 6/2001 | Willis ...................... B62B 9/22 280/30 |
| 6,286,844 | B1 | * | 9/2001 | Cone, II ................... B62B 9/28 280/47.41 |
| 6,554,343 | B2 | * | 4/2003 | Sugiyama .............. B60N 2/283 296/68.1 |
| 6,774,589 | B2 | * | 8/2004 | Sato ........................ A47D 9/02 297/260.1 |
| 7,485,086 | B2 | * | 2/2009 | Dickie ..................... A47D 9/02 600/28 |
| D622,070 | S | * | 8/2010 | Holbrook ...................... D6/333 |
| 7,862,118 | B2 | * | 1/2011 | Sims, Jr. .................. A47D 9/04 297/260.2 |
| 8,152,647 | B2 | * | 4/2012 | Tuckey ................ A47D 13/105 297/256.12 |
| 8,567,866 | B2 | * | 10/2013 | Carimati Di Carimate ................. A47D 1/008 297/184.13 |
| 9,033,415 | B2 | * | 5/2015 | Hopke ..................... A47D 9/02 297/260.2 |
| 9,421,992 | B2 | * | 8/2016 | Mills ...................... B62B 7/145 |
| 9,764,755 | B2 | * | 9/2017 | D'anastasi ............... B62B 9/22 |
| 2002/0113469 | A1 | * | 8/2002 | Stern ...................... A47D 13/10 297/256.16 |
| 2007/0120404 | A1 | * | 5/2007 | Bellows .................... A47D 9/02 297/256.16 |
| 2009/0302578 | A1 | * | 12/2009 | White ....................... B62B 9/28 280/642 |
| 2011/0148058 | A1 | * | 6/2011 | Campos ................... B62B 7/12 280/47.12 |

FOREIGN PATENT DOCUMENTS

| | | | | |
|---|---|---|---|---|
| EP | 1716792 | A1 | * | 11/2006 ............ A47D 1/00 |
| GB | 421007 | A | * | 12/1934 ............ B62B 9/185 |
| GB | 424243 | A | * | 2/1935 ............ B62B 9/22 |
| GB | 2290465 | A | * | 1/1996 ............ B62B 7/14 |
| WO | WO-2004024492 | A1 | * | 3/2004 ........... B60N 2/2848 |

\* cited by examiner

CHILD STROLLER WITH DIRECTIONAL ROCKER

RELATED APPLICATION

This patent application claims the benefit of U.S. Provisional Application No. 62/477,273, filed Mar. 27, 2017, the disclosures of which is incorporated herein by reference in their entirety for all purposes.

TECHNICAL FIELD

The present application relates to child strollers, to child rockers, and to child strollers integrating child rockers.

BACKGROUND

A typical child stroller includes a static or immobile seat. Thus, as an adult pushes this strollers, the child generally experiences unidirectional motion in the forward and backward directions. A new stroller design is needed to improve the child's stroller experience by enhancing the range of motion experienced by the child.

SUMMARY

A child stroller includes: a frame; a plurality of wheels; a child-seat assembly configured to rock back-and-forth with respect to the frame; a rocker assembly secured to the child-seat assembly. The rocker assembly includes: (a) a plurality of legs, each leg defining an undersurface, each undersurface being arced; (b) a rocker base, the rocker base comprises an inner surface. The stroller is configured such that when the child-seat assembly rocks back-and-forth with respect to the frame, the legs rock back-and-forth upon the inner surface of the rocker base.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
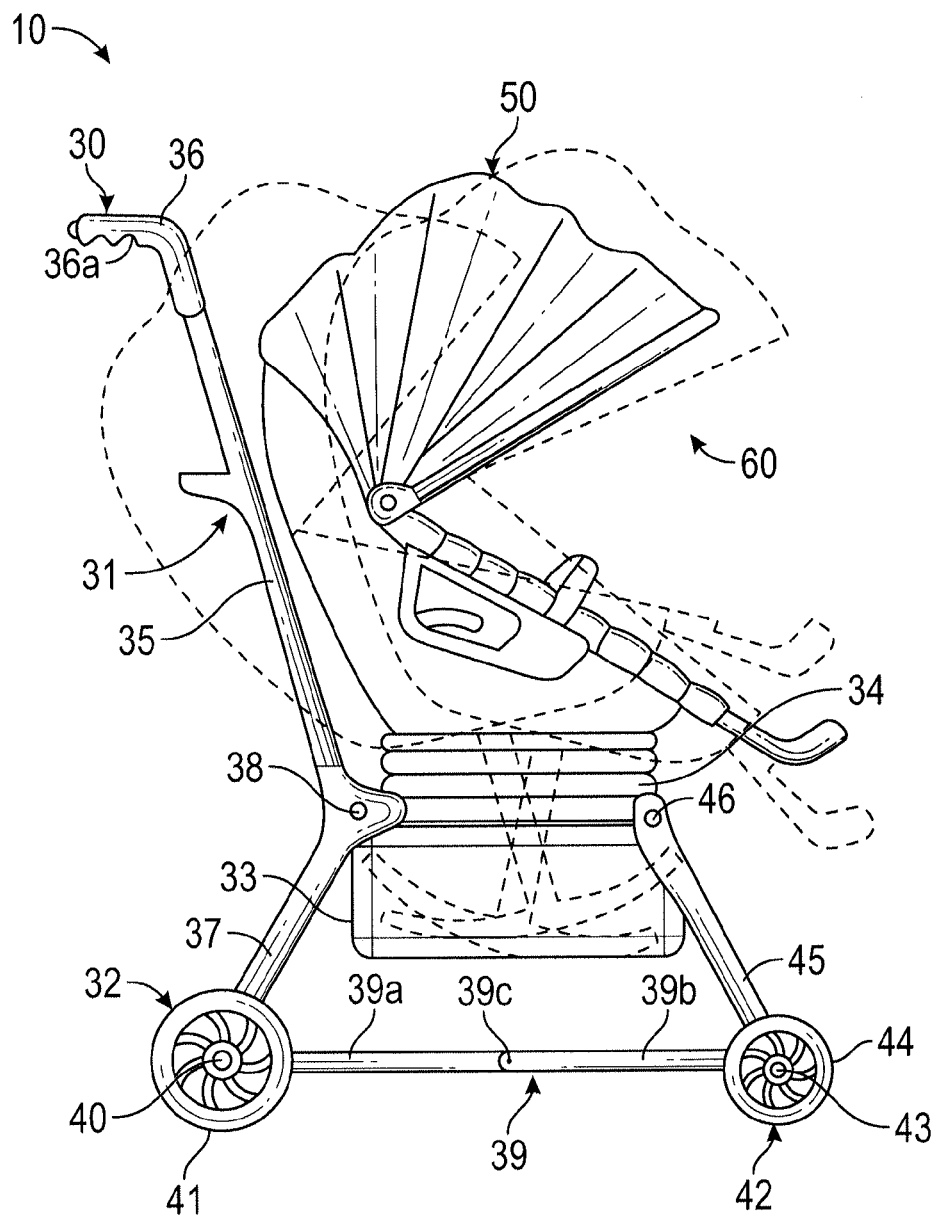
FIG. 1 is a side elevational view of a stroller.
Figure 2:
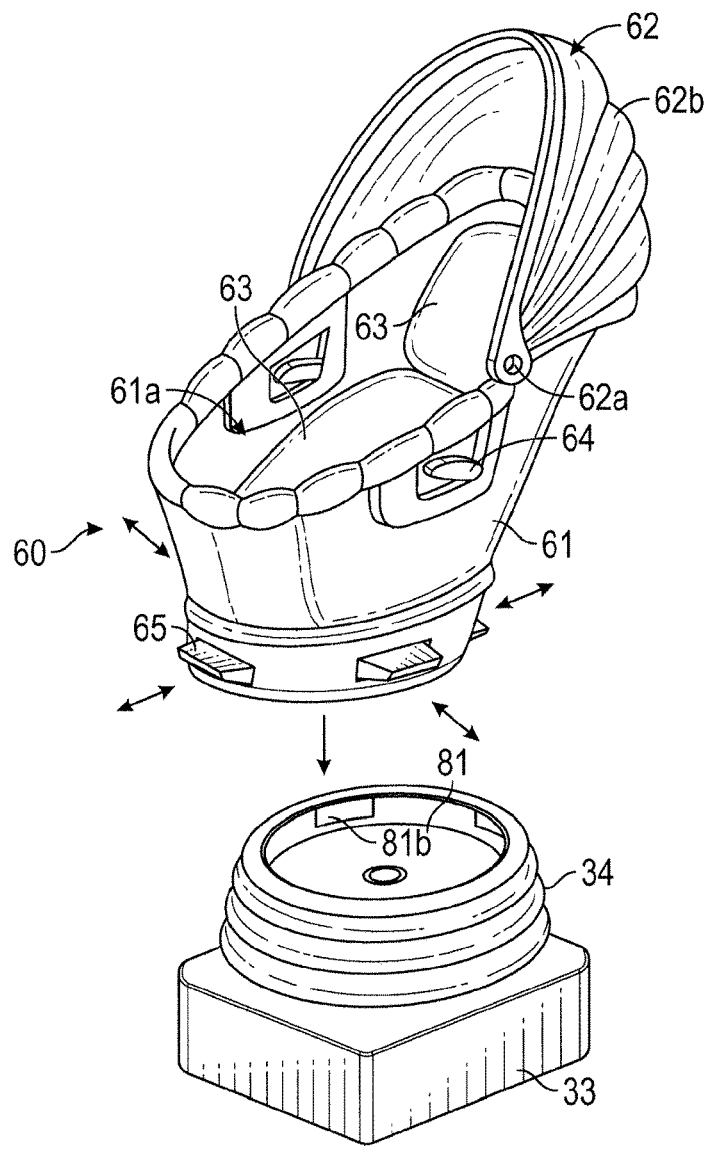
FIG. 2 is an exploded isometric view of a seat assembly, a gasket, and a rocker base.
Figure 2A:
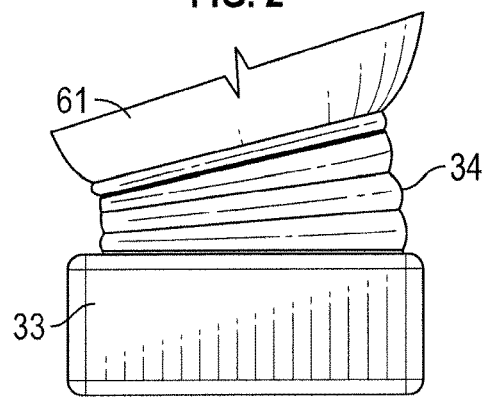
FIG. 2A is a side elevational view of the seat assembly, the gasket, and the rocker base.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 illustrates a stroller 10 consistent with the present disclosure. Stroller 10 includes a frame assembly 30 and a rockable seat assembly 50. Frame assembly 30 includes a plurality of stiff rods 31, a rear wheel assembly 32, a front wheel assembly 42, a rocker housing 33, and a gasket 34. Rockable seat assembly 50 includes a seat assembly 60, a rocking assembly 80, a plurality of spring assemblies 100, and a plunger lock 110.

Because FIG. 1 is a side view of stroller 10, some rods are not shown. It should be appreciated that each of the various rods described herein is matched with an opposing and mirrored rod existed on the left side of stroller 10. Put differently rods 31 include right rods (shown) and left rods (not shown). The left rods are mirrored images of the right rods.

One end of right first rod 35 is covered with a compressible handle sleeve 36, which defines a plurality of inner recesses 36a for accommodating an adult's fingers. The other end of right first rod 35 is secured to right second rod 37. A portion of right second rod 37 may define a threaded hole for threadbly receiving right first rod 35. Although not shown, a first transverse pin or rod may extend between right first rod 35 and the left first rod (not shown). A second transverse pin 38 extends through some or all of (a) right first rod 35, right second rod 37, rocker base 33, the left first rod (not shown), and the left second rod (not shown).

Right second rod 37 is secured to right third rod 39 (e.g., via a pin or a threaded connection). The same applies to left second rod (not shown) and left third rod (not shown). An axle 40 extends through right third rod 39 and left third rod (not shown). Each of these rods defines a transverse and cylindrical chamber accommodating axle 40 and serving as a bearing surface for axle 40. These chambers may be packed with grease to facilitate rotation of axle 40 with respect to rod assembly 31. One end of axle 40 is affixed to right rear wheel 41. The opposing end of axle 40 is affixed to a left rear wheel (not shown).

To facilitate folding and storage, right third rod 39 may include an inner rod 39a, an outer rod 39b, and a transverse pin 39c. Inner rod 39a is closer to rocker base 33 than outer rod 39b. Due to transverse pin 39c, rods 39a, 39b are pivotable about transverse pin 39c. The same applies to the left third rod (not shown).

Right third rod 39 is secured to right fourth rod 45 (e.g., via a pin or threaded connection). Front wheel assembly 42 includes an axle 43, a right wheel 44, and a left wheel (not shown). Front wheel assembly 42 interacts with right third rod 39 and the left third rod (not shown) in the same manner as rear wheel assembly 32 (i.e., axle 43 is rotatably journaled inside right third rod 39 and the left third rod (not shown). Transverse pin 46 extends through right fourth rod 45, rocker base 33, and a left fourth rod (not shown).

Figure 7:
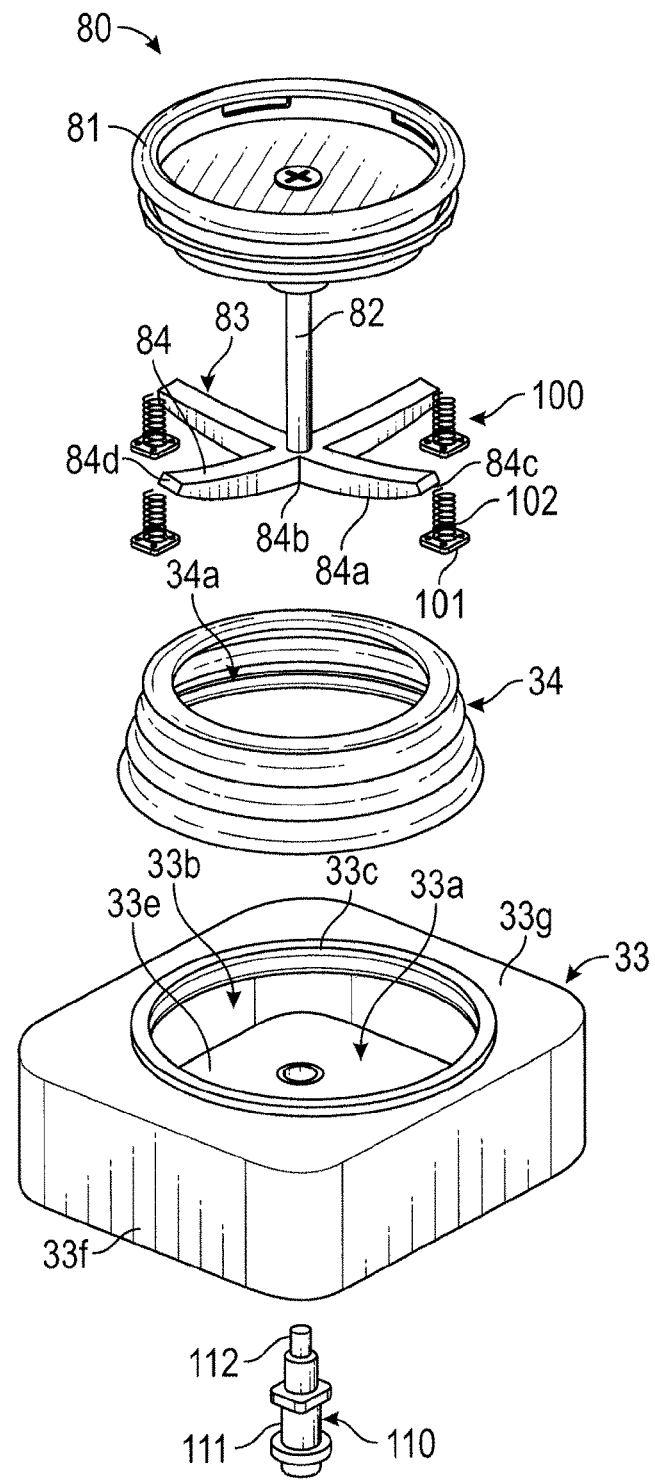
FIG. 7 is an exploded isometric view of the rocker assembly, the gasket, the rocker base, and a pin assembly.

Referring to FIG. 7, base 33 is box-shaped (e.g., cubed) and defines a box-shaped rocker chamber 33a and a circular inlet 33b. Base 33 includes a circumferentially extending ring 33c defining an annular recess 33d for accommodating gasket 34. When viewed in cross section, ring 33c is "J" shaped. Annular recess 33d is L-shaped when viewed in cross-section. Base 33 includes a bottom wall 33e, four side walls 33f, and an apertured top wall 33g, which at least partially defines circular inlet 33b.

Base 33 includes a guide assembly 47, formed as a plurality of non-contacting corner plates 48. Each corner plate 48 is structurally identical. Corner plates 48 are fastened to base 33 (e.g., via fasteners, via glue, via welding).

Gasket 34 is annular and made from a flexible material (e.g., rubber). Gasket 34 defines an inner cylindrical void 34a. Gasket 34 includes "U" shaped (when viewed in cross-section) opposing ends 34b, 34c. Lower U-shaped opposing end 34b is compressively retained within annular recess 33d. Upper U-shaped opposing end 34c is compressively retained within annular groove 81a or 81c. Both ends 34b, 34c may substantially fill or occupy their corresponding annular recesses/grooves and thus be compressively retained therein.

Seat assembly 60 includes a body 61, a retractable hood 62, a plurality of seat cushions 63, one or more levers 64, and one or more radial tabs 65. Body 61, in conjunction with cushions 63, defines a child chamber 61a. Retractable hood 62 is configured to occupy a retracted position where hood 62 encloses a minor portion of child chamber 61a and an extended position where hood 62 encloses a major portion of child chamber 61a. Hood 62 may be configured such that when in the extended position, some gap is defined between body 61 and hood 62 to enable fluid communication between child chamber 61a and ambient.

Hood 62 may include a rigid skeleton (not shown) at least partially pivotable about a pair of transverse pins 62a, and a foldable textile 62b. When hood 62 is extended, at least a portion of the rigid skeleton (not shown) pivots forward about transverse transverse pins 62a, thus smoothing/flattening/de-wrinkling textile 62b. When hood 62 is retracted, the same portion of the rigid skeleton (not shown) pivots backward about transverse pins 62, thus wrinkling/bunching up textile 62b.

One or more levers 64 are mechanically coupled (e.g., geared) with locking tabs 65. When levers 64 are twisted in a first direction, locking tabs 65 radially protrude/extend from base 61. When levers 64 are twisted in a second direction, locking tabs 65 radially retreat into base 61 (or at least radially retreat such that they radially protrude to a lesser degree). Locking tabs 65 are thus configured to occupy a fully extended position and a fully retracted position. Levers 64 and are spring-biased toward the first direction such that in the absence of external force, locking tabs 65 remain in the fully extended position. To rotate levers 64 in the second direction, the adult must overcome the biasing force of the springs. When locking tabs 65 fully radially protrude/extend from base 61, locking tabs outwardly radially protrude from, and thus fully extend through voids 81b.

Figure 8:
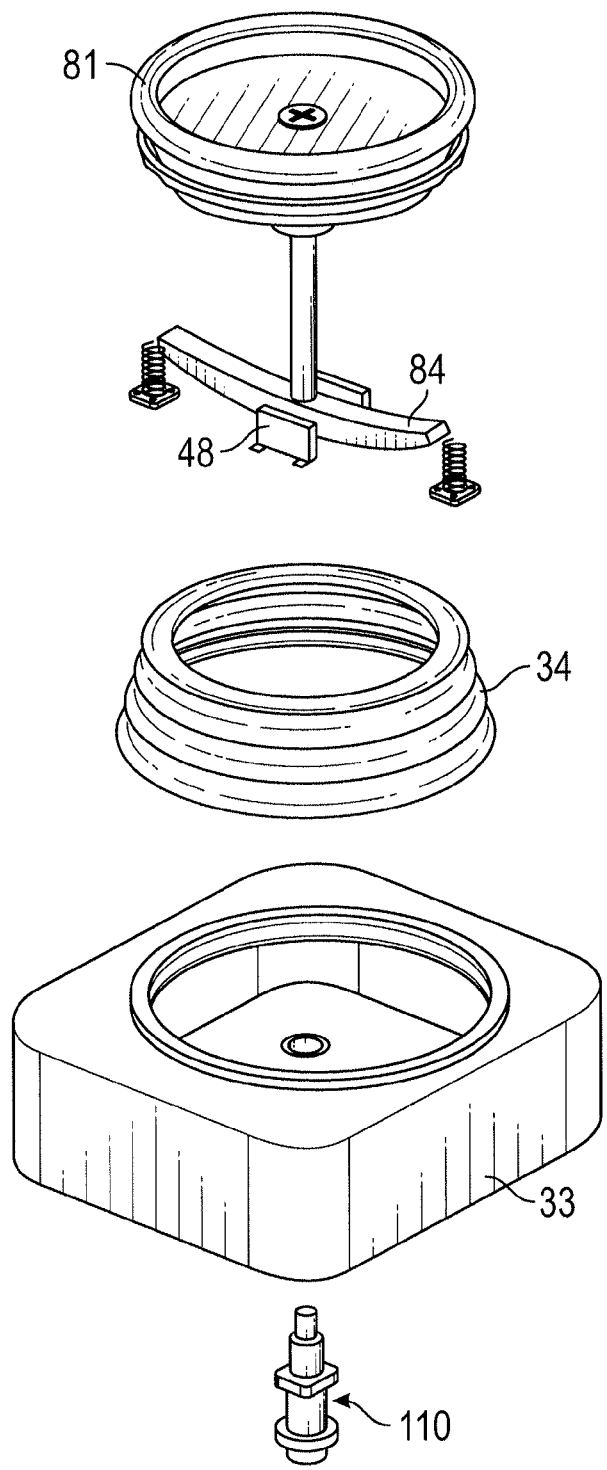
FIG. 8 is an exploded isometric view of a second embodiment of the rocker assembly configured to rock from side-to-side.
Figure 9:
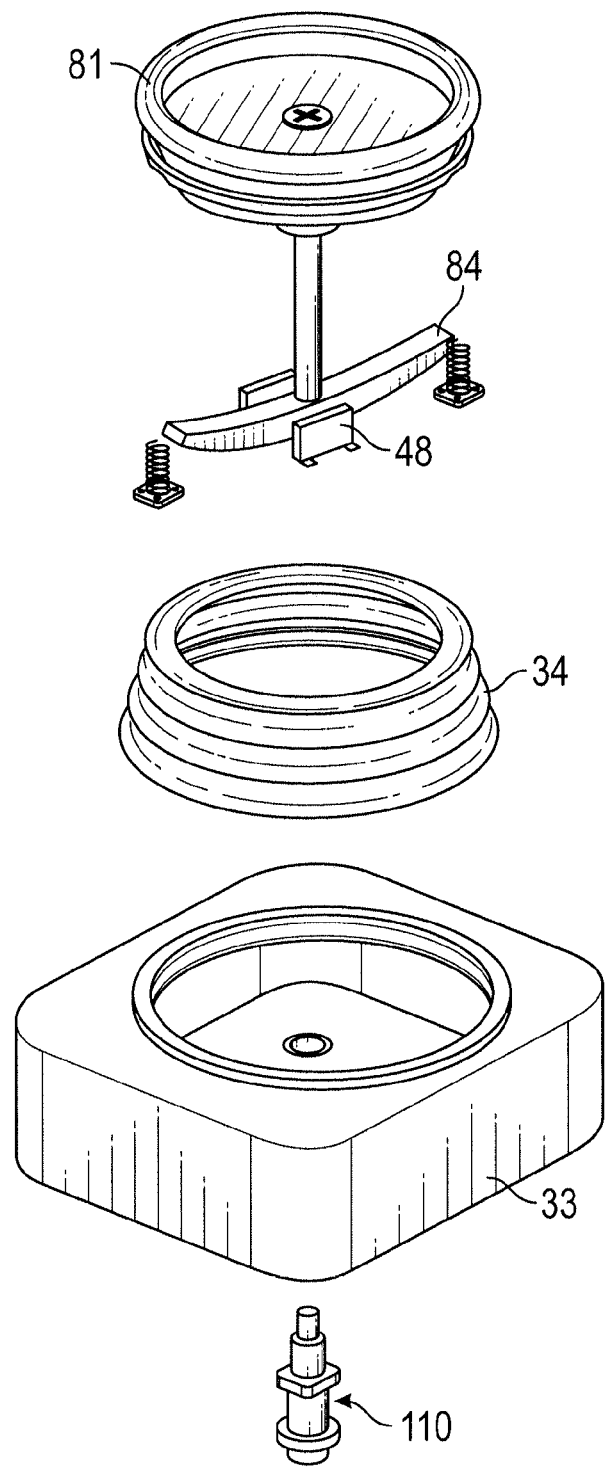
FIG. 9 is an exploded isometric view of a third embodiment of the rocker assembly configured to rock from front-to-back.

Referring now to FIG. 7, rocking assembly 80 includes a cup or base 81, a support rod 82, and a leg assembly 83, which rocks on bottom wall 33e of rocker base 33. The combination of cup or base 81 and support rod 82 is referred to as a plunger. Leg assembly 83 includes four perpendicularly extending legs 84. Each of the legs 84 are structurally identical. Each leg 84 includes a sloped undersurface 84a and an end surface 84d. Sloped undersurfaces 84a meet at an intersection 84b. Each undersurface 84a terminates at an edge 84c. The lowest point of each sloped undersurface 84a is intersection 84b. The highest point of each sloped undersurface 84a is edge 84c. Although four legs 84 are shown, any even number of diametrically opposed legs 84 are possible (e.g., two diametrically opposed legs, six diametrically opposed legs). FIGS. 8 and 9 illustrate the rocking assembly 80 with two legs 84. In FIG. 8, the legs 84 and the corner plates 48 are positioned to facilitate the rocking assembly 80 moving side-to-side with respect to the frame assembly 30 and prevent the rocking assembly 80 moving front-to-back with respect to the frame assembly 30. In FIG. 9, the legs 84 and the corner plates 48 are positioned to facilitate the rocking assembly 80 moving front-to-back with respect to the frame assembly 30 and prevent the rocking assembly 80 moving side-to-side with respect to the frame assembly 30.

Figure 7A:
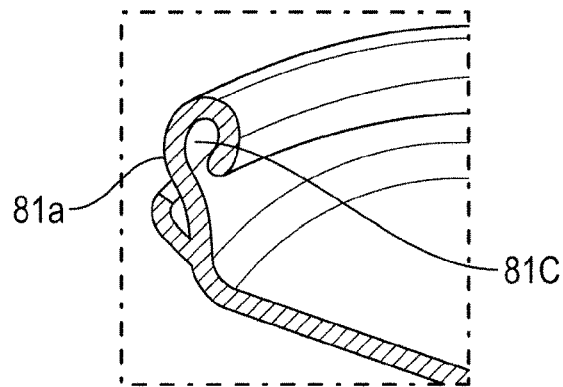
FIG. 7A is a cross sectional view of the cup or bowl.
Figure 7B:
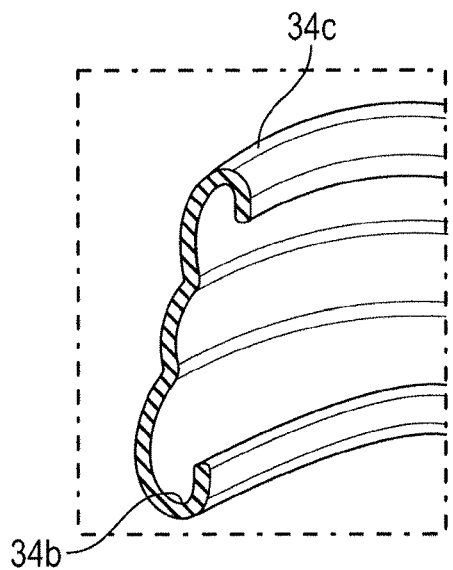
FIG. 7B is a cross sectional view of the gasket.
Figure 7C:
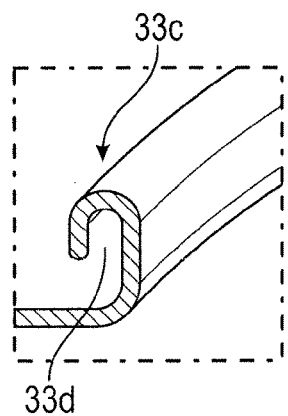
FIG. 7C is a cross sectional view of the rocker base.

Cup or base 81 defines a plurality of box-shaped voids 81b for receiving radial tabs 65. When radial tabs 65 are extended, radial tabs 65 extend through voids 81b, thus locking seat assembly 60 into cup or base 81. As shown in FIG. 7A, cup or base 81 defines an outer annular groove 81a and an inner annular groove 81c. Either of these grooves 81a, 81c may receive end 34c of flexible gasket 34.

Figure 3:
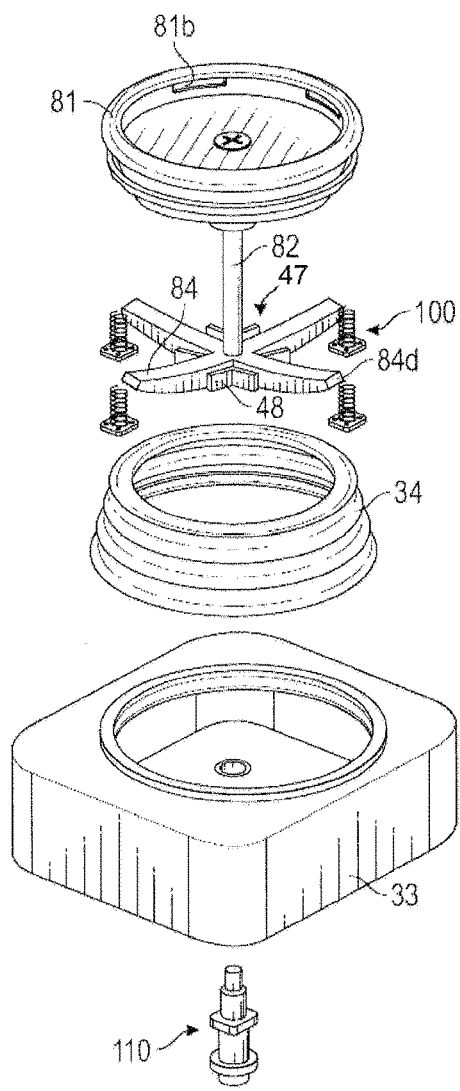
FIG. 3 is an exploded isometric view of a rocker assembly, the gasket, and the rocker base.
Figure 3A:
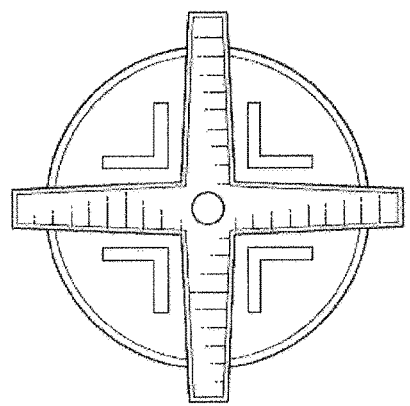
FIG. 3A is a bottom plan view of the rocker assembly and a guide.
Figure 3B:
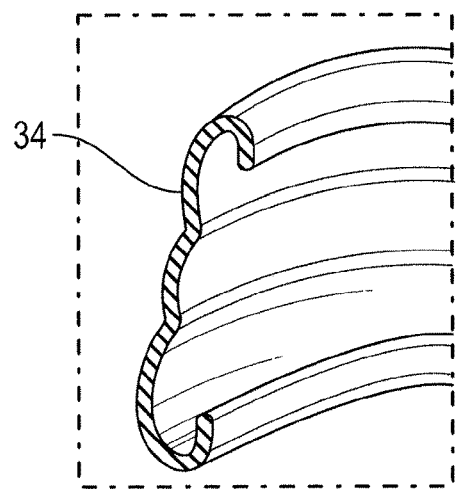
FIG. 3B is a cross sectional view of the gasket.
Figure 3C:
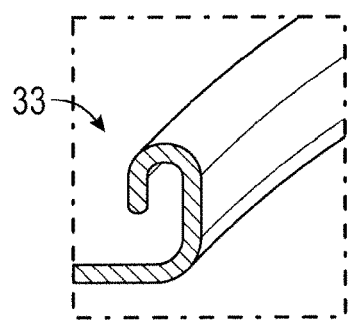
FIG. 3C is a cross sectional view of the rocker base.
Figure 3D:
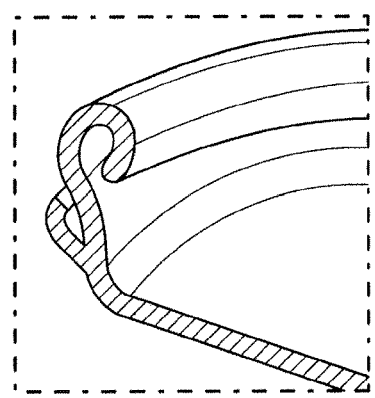
FIG. 3D is a cross sectional view of a cup or bowl of the rocker assembly.
Figure 4:
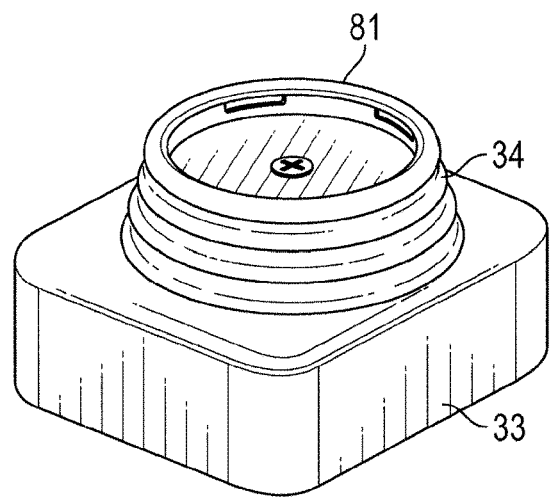
FIG. 4 is an isometric view of an assembly of the rocker assembly, the gasket, and the rocker base.

As shown in FIG. 3, leg assembly 83 fits into guide assembly 47. At least the insides of each corner plate 48 may be greased or lubricated to facilitate rocking of leg assembly 83 within guide assembly 47 and upon bottom wall 33e. Although FIG. 3A shows gaps between the insides of corner plates 48 and legs 84, in practice, such gaps may be absent such that the inside of each corner plate 48 contacts at least two legs 84 via lubricant (e.g., grease). This configuration advantageously prevents leg assembly 83 from slipping with respect to guide assembly 47. To further prevent slipping, the bottom wall of rocking base 33 may be rough (e.g., have a sand-paper quality).

Figure 5:
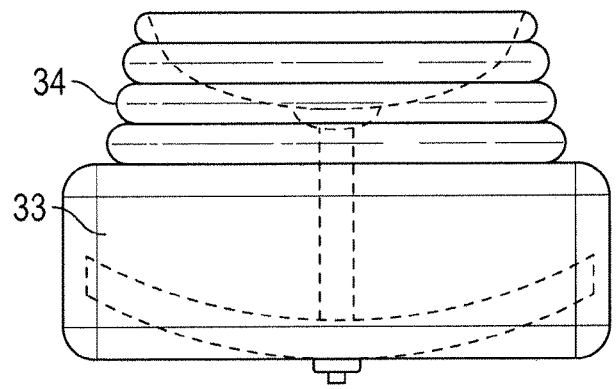
FIG. 5 is a side elevational view of the gasket and the rocker base with the rocker assembly, which is hidden, shown in dashed lines.
Figure 6:
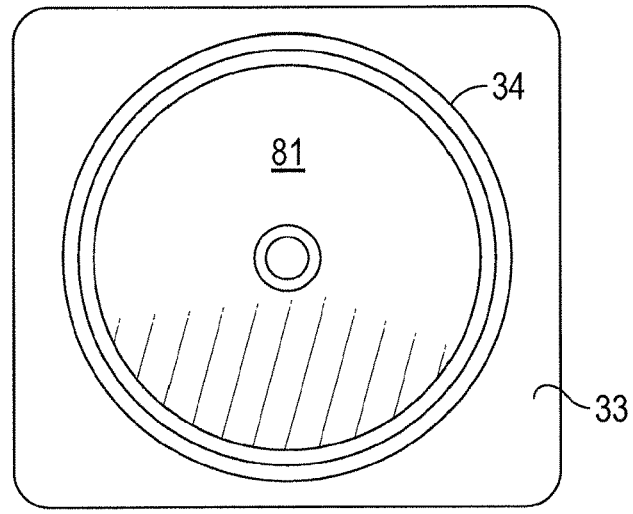
FIG. 6 is a top plan view of the gasket, the rocker base, and the rocker assembly.

With reference to FIGS. 5 and 7, rocking base 33 may be sized such that when an edge 84c touches bottom wall 33e of base 33, leg end surface 84d flushly contacts side wall 33f of rocking base 33. As such, each leg end surface 84d may be sloped with respect to vertical, such that when leg end surface 84d contacts side wall 33f, leg end surface 84d is parallel with side wall 33f. Bottom wall 33e may define channels, each channel corresponding to one leg 84. In the embodiment shown in FIG. 7, bottom wall 33*e* could define four channels, each of the four channels directly below each of legs 84. These channels would help guide legs 84 during rocking motion. Put differently, the side walls of these channels would prevent leg assembly 83 from rotating or twisting with respect to rocking base 33 and thus serve a similar function to guide assembly 47.

Each spring assembly 100 is secured to bottom wall 33*e* and positioned directly below one undersurface 84*a*. Each spring assembly 100 includes a base plate 101 and a vertical spring 102. Springs 102 are configured to occupy an extended or relaxed position and a retracted or compressed position. Due to internal mechanical stress, springs 102 are biased toward their extended and relaxed positions. When undersurface 84*a* bears on spring 102, undersurface 84*a* transfers at least some weight of rockable seat assembly 50 onto spring 102, thus causing spring 102 to move to its retracted or compressed position.

Eventually, weight in rockable seat assembly 50 will rock in a different direction. Spring 102 will move from its retracted or compressed position to its extended or relaxed position, thus accelerating the rate at which seat assembly 50 rocks.

Plunger lock 110 includes a base 111, a spring (not shown), a retractable pin 112, and a push-button (not shown). Plunger lock 110 functions similar to a ball-point pen: when a user presses the push-button, the retractable pin 112 translates, against bias of the spring, and away from base 111, to an extended position where outwardly pin 112 protrudes from base 111; when the user re-presses the push-button, the spring returns retractable pin 112 to a retracted position, where pin 112 is confined within base 111.

Base 111 includes outer-threads, which enable threading of plunger lock 110 into an open socket defined in rocker base 33. Rocking assembly 80 defines a blind bore for receiving retractable pin 112 when pin 112 is in the extended position. As such, when pin 112 is extended into the blind bore of rocking assembly 80, rocking assembly 80 is immobile. According to some embodiments, the blind bore of rocking assembly 80 may be defined through undersurface intersection 84*b* of leg assembly 83

Figure 10:
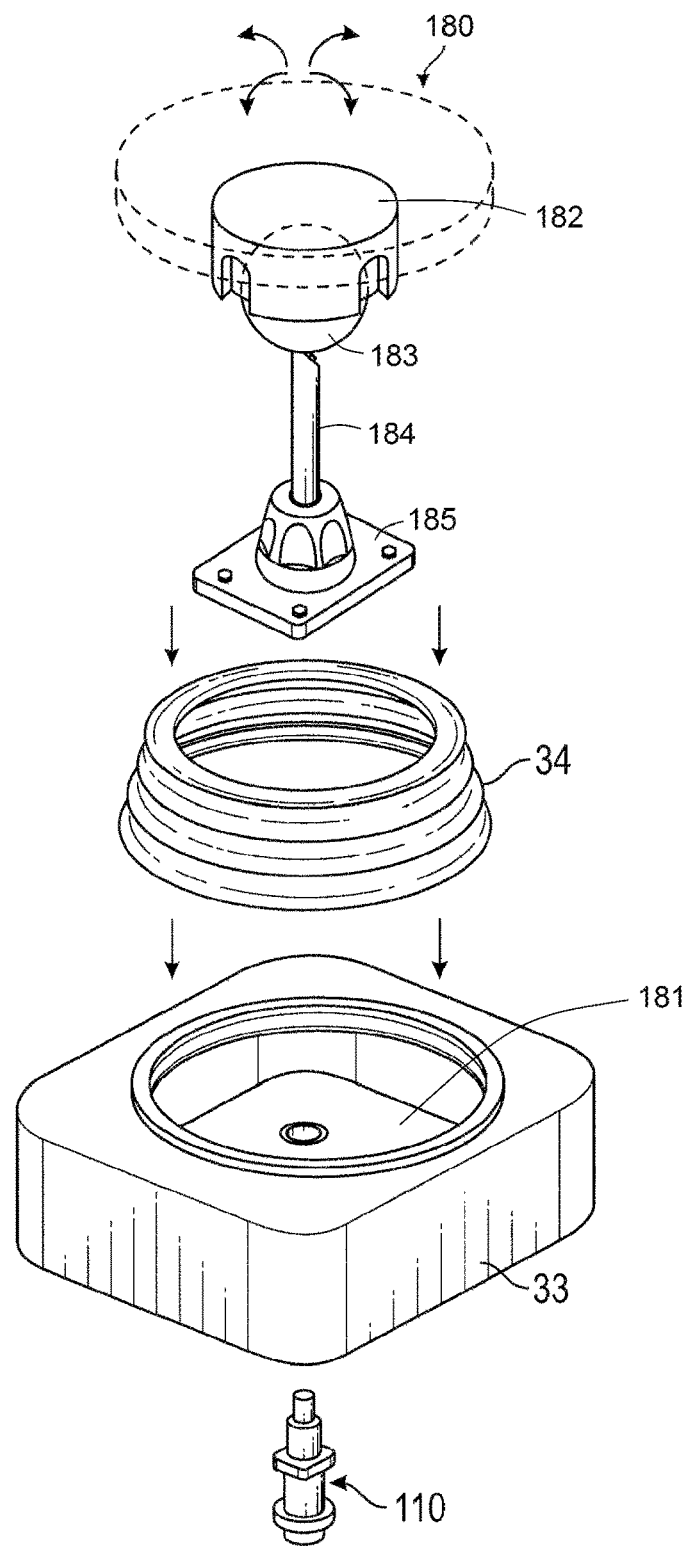
FIG. 10 is an exploded isometric view of a fourth embodiment of the rocker assembly.
Figure 11:
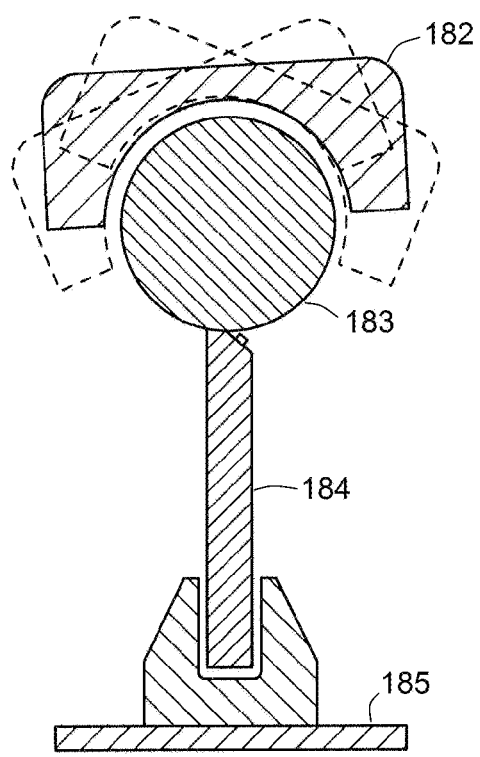
FIG. 11 is a cross-section depicting the motion of the third embodiment of the rocker assembly.

FIGS. 10 and 11 shows an alternate guide assembly 180, which includes a cup or base 181, a cap 182, a ball 183, a support rod 184, and a rod base 185. Rod base 185 is secured (e.g., fastened) to rocking base 33. Support rod 184 is affixed to rod base 184. Ball 183, which is spherical, is affixed to support rod 184.

Lubricant is applied on the outer surface of ball 183, upon which cap 182 sits. More specifically, cap 182 defines an inner spherical void (e.g., semispherical). According to preferred embodiments, the inner spherical void is more than 50% of a sphere to reduce the chances of cap 182 deseating from ball 183. Cup or base 181 is affixed to cap 182. Cup or base 181 may share any or all of the features of cup or base 81.

The invention claimed is:

1. A child stroller comprising:
a frame;
a plurality of wheels;
a child-seat assembly configured to rock back-and-forth with respect to the frame; and
a rocker assembly secured to the child-seat assembly, the rocker assembly comprising:
a plurality of legs, each leg defining an undersurface, each undersurface being arced, wherein the plurality of legs comprise at least four legs to enable rocking in two different perpendicular directions; and
a rocker base, the rocker base comprises an inner surface,
the stroller being configured such that when the child-seat assembly rocks back-and-forth with respect to the frame, the legs rock back-and-forth upon the inner surface of the rocker base.

2. The stroller of claim 1, wherein the child-seat assembly comprises a cushion and a retractable hood.

3. The stroller of claim 1, further comprising first and second springs arranged such that when the child-seat assembly rocks forward, the first spring compresses while the second spring relaxes and when the child-seat assembly rocks backward, the first spring relaxes while the second spring compresses.

4. The stroller of claim 1, wherein the child-seat assembly is configured to rock side-to-side with respect to the frame to enable to the child-seat assembly to rock in the two different perpendicular directions.

5. The stroller of claim 4, wherein the two different perpendicular directions lie on a common plane.

6. A child stroller, comprising:
a frame;
a plurality of wheels;
a child-seat assembly configured to rock back-and-forth with respect to the frame; and
a rocker assembly secured to the child-seat assembly, the rocker assembly comprising:
a plurality of legs, each leg defining an undersurface, each undersurface being arced;
a cup and an extension joining the cup with the plurality of legs; and
a rocker base, the rocker base comprises an inner surface,
the stroller being configured such that when the child-seat assembly rocks back-and-forth with respect to the frame, the legs rock back-and-forth upon the inner surface of the rocker base.

7. The stroller of claim 6, wherein the child-seat assembly comprises a cushion and a retractable hood.

8. The stroller of claim 6, wherein the cup is bowl-shaped and the child-seat assembly is positioned on the cup.

9. The stroller of claim 8, wherein the cup defines a plurality of slots through which tabs of the child-seat assembly protrude.

10. The stroller of claim 9, wherein the tabs of the child-seat assembly are retractable.

11. The stroller of claim 10, wherein the rocker assembly comprises a guide assembly, the guide assembly comprising at least two plates separated by one of the legs.

12. The stroller of claim 11, wherein the rocker assembly comprises a lubricant applied to the guide assembly to facilitate motion of the legs with respect to the guide assembly.

13. The stroller of claim 12, wherein the rocker assembly comprises a flexible annular gasket disposed between, and secured to, the rocker base and the cup.

14. The stroller of claim 6, further comprising first and second springs arranged such that when the child-seat assembly rocks forward, the first spring compresses while the second spring relaxes and when the child-seat assembly rocks backward, the first spring relaxes while the second spring compresses.

15. The stroller of claim 6, wherein the child-seat assembly is configured to rock side-to-side with respect to the frame and is thus configured to rock in four different directions.

16. The stroller of claim 15, wherein the four different directions lie on a common plane.

17. A child stroller comprising:
   a frame;
   a plurality of wheels;
   a child-seat assembly configured to rock back-and-forth with respect to the frame; and
   a rocker assembly secured to the child-seat assembly, the rocker assembly comprising:
      a plurality of legs, wherein each of the plurality of legs defines an undersurface that is arced;
      a cup;
      an extension joining the cup with the plurality of legs; and
      a rocker base comprising an inner surface upon which the plurality of legs are configured to rock back-and-forth to cause the child-seat assembly to rock back-and-forth with respect to the frame.

* * * * *